US012580133B2

(12) United States Patent (10) Patent No.: US 12,580,133 B2
Mildner et al. (45) Date of Patent: Mar. 17, 2026

(54) VACUUM VARIABLE CAPACITOR HAVING A VACUUM SEALED ENCLOSURE AND A MECHANICAL DRIVE SYSTEM

(71) Applicant: COMET AG, Flamatt (CH)

(72) Inventors: Mark Mildner, Gurbrü (CH); Marco Fasel, Düdingen (CH)

(73) Assignee: COMET AG, Flamatt (CH)

( * ) Notice: Subject to any disclaimer, the term of this patent is extended or adjusted under 35 U.S.C. 154(b) by 94 days.

(21) Appl. No.: 18/711,161

(22) PCT Filed: Oct. 3, 2022

(86) PCT No.: PCT/EP2022/077428
§ 371 (c)(1),
(2) Date: May 17, 2024

(87) PCT Pub. No.: WO2023/094056
PCT Pub. Date: Jun. 1, 2023

(65) Prior Publication Data
US 2025/0022662 A1 Jan. 16, 2025

(30) Foreign Application Priority Data

Nov. 25, 2021 (EP) ..................................... 21210518

(51) Int. Cl.
*H01G 5/14* (2006.01)
*H01G 5/013* (2006.01)
(Continued)

(52) U.S. Cl.
CPC ............... *H01G 5/14* (2013.01); *H01G 5/013* (2013.01); *H01G 5/04* (2013.01); *H01G 5/38* (2013.01)

(58) Field of Classification Search
None
See application file for complete search history.

(56) References Cited

U.S. PATENT DOCUMENTS 3,040,220 A 6/1962 Neibaur
2002/0163398 A1 11/2002 Kondo et al.
(Continued)

FOREIGN PATENT DOCUMENTS

JP 2964248 B1 10/1999

OTHER PUBLICATIONS

European Search Report (Jun. 2, 2022) for corresponding European App. 21210518.3.

(Continued)

*Primary Examiner* — Eric W Thomas
(74) *Attorney, Agent, or Firm* — Alston & Bird LLP

(57) ABSTRACT

A vacuum variable capacitor includes a vacuum sealed enclosure to contain a vacuum dielectric medium, wherein the enclosure includes a first plate and a second plate, the first plate and the second plate being separated by an electrically insulating element, a fixed electrode attached inside the enclosure to the first plate and a movable electrode attached to a movable plate, wherein the movable plate is attached inside the enclosure to the second plate by at least one vacuum bellows, wherein the vacuum capacitor includes a mechanical drive system for displacing, in particular translating, the movable plate relative to the first plate so as to vary the capacitance of the vacuum capacitor, wherein the mechanical drive system includes a ball screw arranged to drive the movable plate and wherein the mechanical drive system includes outside of the vacuum sealed enclosure a limiting element limiting the maximum distance between the first plate and the movable plate and wherein the drive system includes a nut attached to the ball screw, wherein the nut includes a first shoulder configured to abut against the limiting element to limit the maximum distance between the first plate and the movable plate.

14 Claims, 1 Drawing Sheet

(51) Int. Cl.
   _H01G 5/04_        (2006.01)
   _H01G 5/38_        (2006.01)

(56)            References Cited

U.S. PATENT DOCUMENTS

| | | | |
|---|---|---|---|
| 2005/0133481 A1 | 6/2005 | Takahashi et al. | |
| 2010/0254066 A1 | 10/2010 | Takahashi | |
| 2013/0100574 A1* | 4/2013 | Abrecht | H01G 5/01 |
| | | | 29/25.03 |
| 2015/0009603 A1* | 1/2015 | Abrecht | H01G 5/38 |
| | | | 361/278 |
| 2016/0005540 A1* | 1/2016 | Tanner | H01G 4/224 |
| | | | 361/301.3 |

OTHER PUBLICATIONS

International Search Report (Jan. 16, 2023) for corresponding International App. PCT/EP2022/077428.

* cited by examiner

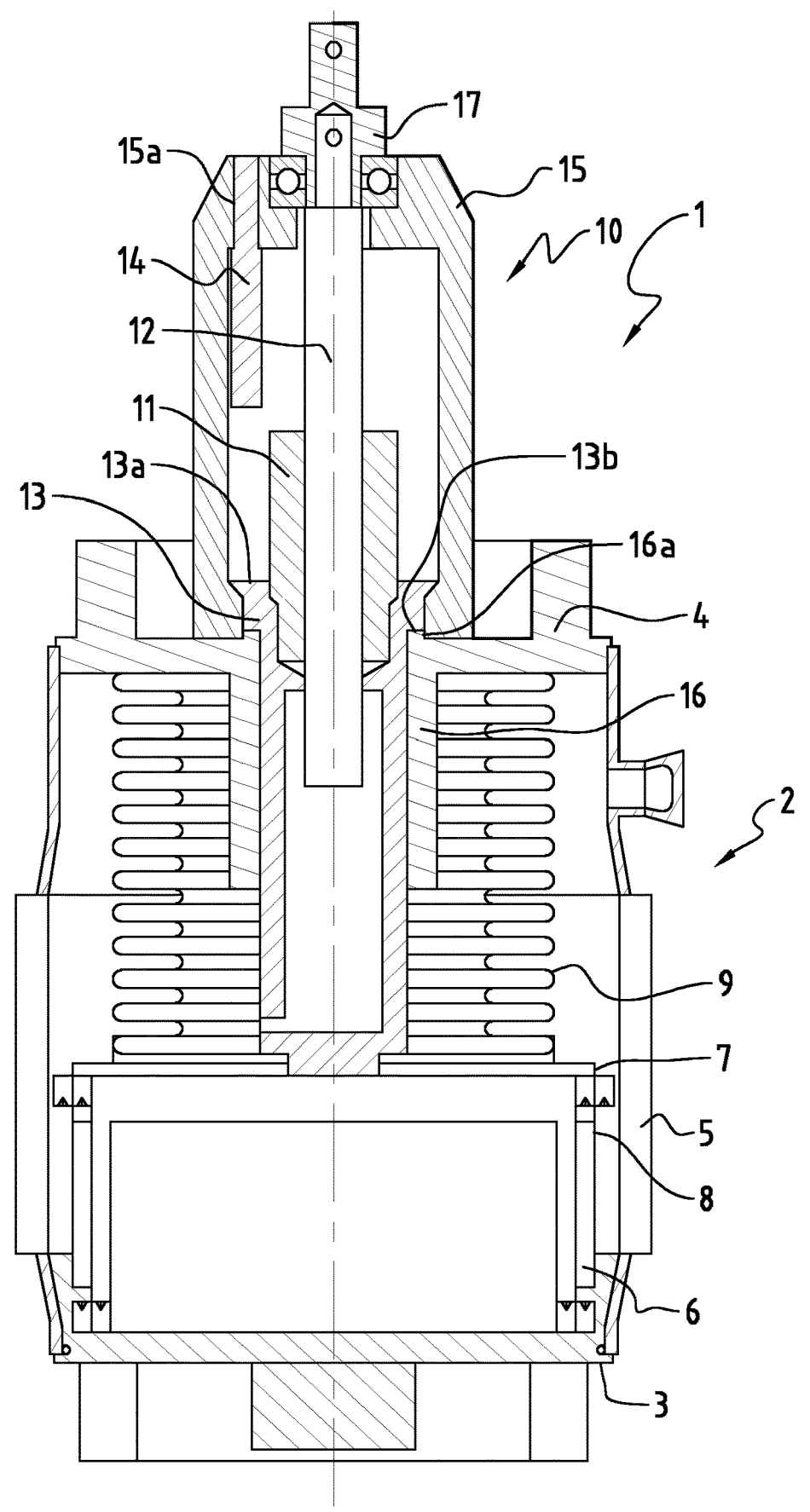

VACUUM VARIABLE CAPACITOR HAVING A VACUUM SEALED ENCLOSURE AND A MECHANICAL DRIVE SYSTEM

BACKGROUND AND SUMMARY

The present invention relates to the field of vacuum capacitors, in particular to the field of vacuum variable capacitor.

Vacuum capacitors are electric capacitors that are suitable for high power applications, typically compatible with voltages of several thousand Volts, or even tens of thousands of Volts thanks to the excellent dielectric properties of vacuum. Vacuum capacitors can carry AC currents (especially RF currents) of tens of Amperes or even hundreds of Amperes thanks to the very low losses of the conducting parts, i.e., metal electrodes and metal collars used for connecting vacuum capacitors to other circuit elements.

Vacuum variable capacitors constitute a sub-group of vacuum capacitors and are also known for their excellent suitability for high power applications. These vacuum variable capacitors permit the adjustment of the capacitance value by adjusting an electrode position with respect to the other electrode, both situated inside of the vacuum enclosure of the vacuum capacitor. In practice, it is not the electrode separation which is changed but the electrode surface overlap by changing the distance between the plates carrying the electrodes. The range of adjustment of the capacitance value is called tunability and is defined by $t=(C_{max}-C_{min})/C_{max}$ where $C_{max}$ and $C_{min}$ are the maximum and the minimum capacitance value which can be achieved with a given capacitor. Most vacuum variable capacitors are designed to provide at least 90% tunability, some will provide tunability of 98% or even more. Typically, a screw and nut system associated with expandable connection joints, also called bellows, allow to bring the actuation from outside the vacuum to the adjustable electrode inside the vacuum enclosure. For example, a stepper motor controlled by a control software may be used for the actuation part to precisely position the movable electrode and therefore to achieve a specific and precise value of the capacitance of the vacuum variable capacitor. The aforementioned elements used to adjust the capacitance value of the vacuum variable capacitor define its mechanical drive system.

Besides high voltage and current capabilities, a specific quality criterion of the sub-group of vacuum variable capacitors is their drive system's performance. Not only, is it valuable to have a high tunability, but also to provide a long life of the drive system, which can be defined as the number of cycles between $C_{max}$ and $C_{min}$ until failure, to provide a drive system which is adjustable by relatively modest torque, to provide fast and precise mechanical adjustment to fulfil the high demands of many applications.

Typical applications of vacuum capacitors include power delivery systems used in the semiconductor manufacturing industry using radio-frequency (for example at 13.56 MHz) powered plasma tools for deposition and etch processes. The primary function of the vacuum variable capacitor is to adjust and match the impedance of the application load to the impedance of the radio-frequency generator in the power delivery circuitry. Because a plasma load has a time-varying impedance (depending on each processing step, ionizing gas state, residual gas pressure, and other factors) it needs to be adapted ("matched") to the impedance of the generator and RF cables which are optimized by industry standards to work for 50 Ohm impedance. Any impedance mismatch can result in the semiconductor manufacturing process being unsuccessful, and in some cases can also result in the destruction of the generator due to reflected electrical power due to the impedance mismatch between generator and load.

Coming back now to the drive system of vacuum variable capacitors. As stated above, it is desirable to provide a system which can be actuated with modest or low torque. Today most vacuum variable capacitors will require typically stepper motors or other actuators to provide torques larger than 0.4 N·m. in order to be adjusted. It is a goal of the present invention to deliver a vacuum variable capacitor which can be actuated with a reduced torque and without compromising on precision and repeatability of the drive system. To achieve this goal, the vacuum variable capacitor requires a mechanical end stop at the position of the movable electrode corresponding to minimum capacitance $C_{min}$. Prior art vacuum variable capacitors do not normally provide for means to determine a precise value for $C_{min}$. The only available means are basically the bellows being fully compressed. Bellows are not a high precision component, so that this end stop would correspond for example to 32 pF in some cases and in other cases to 35 pF or 27 pF even though the same components (nominally) are being used. Due to this problem, the datasheet of a series-produced vacuum variable capacitor today has to show a higher $C_{min}$ value resulting in a smaller capacitance range, and therefore a poorer indicated tunability simply because of this uncertainty. In the example just mentioned, the manufacturer would publish a "safer" $C_{min}$ value of, for example, 40 pF because the manufacturer knows by experience that whatever the bellows properties within its component tolerances will result in that "safe $C_{min}$" being attainable. In other words, the value published in the datasheet can indeed be reached by the customer for all the delivered capacitors of that type. This reliability is important and the manufacturer agrees to publish a poorer tunability characteristic than would be necessary.

Vacuum variable capacitors comprising a limiting element for limiting the maximum distance between the movable and the fixed plates of the capacitor are known from U.S. Pat. No. 3,040,220A, JP2964248B1, US2002163398A1 and US2010254066A1, the proposed limiting elements do not however provide for a satisfactory solution for the problems mentioned above.

The aim of the present invention, therefore, is to provide a vacuum variable capacitor whose capacitance can be adjusted by low torque while allowing for a precise definition of its minimum capacitance value.

Thus, it is desirable to propose a novel vacuum variable capacitor, with which the above-described drawbacks of the known systems are completely overcome or at least greatly diminished.

It is also desirable to propose a vacuum variable capacitor, whose capacitance can be adjusted with low torque while guaranteeing high precision in the capacitance value.

According to an aspect of the present invention, a vacuum variable capacitor is provided comprising a vacuum sealed enclosure to contain a vacuum dielectric medium, wherein the enclosure comprises a first plate and a second plate, the said first plate and the said second plate being separated by an electrically insulating element, a fixed electrode attached inside the enclosure to the first plate and a movable electrode attached to a movable plate, wherein the movable plate is attached inside the enclosure to the second plate by means of at least one vacuum bellows, wherein the vacuum capacitor comprises a mechanical drive system for displacing, in particular translating, the movable plate relative to the first plate so as to vary the capacitance of the vacuum capacitor, wherein the mechanical drive system comprises a ball screw arranged to drive the movable plate and wherein the mechanical drive system comprises outside of the vacuum sealed enclosure a limiting element limiting the maximum distance between the first plate and the movable plate, wherein the drive system comprises a nut attached to the ball screw, and wherein the nut comprises a first shoulder configured to abut against the limiting element to limit the maximum distance between the first plate and the movable plate.

Thanks to the ball screw, the distance between the first plate and the moving plate, and thus the capacitance of the capacitor, can be changed with low torque. This is particularly advantageous in applications where the capacitance must be changed repeatedly and quickly. With low torque, the requirements for the motor normally used to drive the moving plate can be lowered, allowing smaller and cheaper motors to be used. The limiting element makes it possible to define a precise value for the maximum distance between the plates and thus a minimum value for the capacitance. This value can then be used as a reference value for all capacitance values corresponding to other distances between the plates. Since the capacitance varies inversely with the distance between the plates, it is advantageous to use the minimum capacitance as the reference value. An absolute error on the distance between the plates has less influence on the capacitance at the minimum capacitance value than at the maximum value. An accurate reference value at the minimum capacitance is therefore advantageous. In prior art vacuum variable capacitors, the minimum capacitance value is defined by an element inside the vacuum enclosure such as for instance the bellows. This means that this value must be defined before the enclosure is assembled and evacuated and cannot be defined subsequently. The possibility of defining the reference value for the minimum capacitance by a limiting element outside the vacuum enclosure is therefore advantageous. It is in fact possible to measure the capacitance and define this value as a function of this measurement. Furthermore, several prior art vacuum variable capacitors define the minimum capacitance by means of the maximum compressibility of the bellows. This is problematic since this cannot lead to a precise reference value at minimum capacitance.

As explained above, typical applications of vacuum capacitors include power delivery systems used in the semiconductor manufacturing industry using radio-frequency (for example at 13.56 MHz) powered plasma tools for deposition and etch processes. The primary function of the vacuum variable capacitor is to adjust and match the impedance of the application load to the impedance of the radio-frequency generator in the power delivery circuitry. Because a plasma load has a time-varying impedance (depending on each processing step, ionizing gas state, residual gas pressure, and other factors) it needs to be adapted ("matched") to the impedance of the generator and RF cables which are optimized by industry standards to work for 50 Ohm impedance. Any impedance mismatch can result in the semiconductor manufacturing process being unsuccessful, and in some cases can also result in the destruction of the generator due to reflected electrical power due to the impedance mismatch of the load. It is therefore of primary importance to provide for a vacuum variable capacitor with a precise reference value at minimum capacitance.

Finally, providing for a drive system that comprises a nut attached to the ball screw, wherein the nut comprises a first shoulder configured to abut against the limiting element to limit the maximum distance between the first plate and the movable plate, represents a simple and cost effective way for defining the reference value at the minimum capacitance value.

In a first preferred embodiment of the present invention, the maximum distance between the first plate and the movable plate is adjustable by means of the limiting element. This particularly advantageous since the characteristics of the capacitor can change over time or due to external conditions like temperature. The possibility of being able to adjust the maximum distance and thus the reference value at minimum capacitance thus represents an advantage over the vacuum variable capacitor known in the prior art.

In a further preferred embodiment of the present invention, the nut is at least partially arranged in a guiding element of the enclosure and the nut comprises a second shoulder configured to abut against an edge of the guiding element to limit the minimum distance between the first plate and the movable plate. With this the maximum capacitance value of the capacitor can be defined.

In yet another preferred embodiment of the present invention, the vacuum variable capacitor comprises a cap arranged to cover the ball screw. This is advantageous to protect the drive system and in particular the ball screw in order to have a capacitor which performances are guaranteed over a long period of time. The cap can advantageously be configured to cover entirely the ball screw in order to protect the latter against dust and mechanical shocks.

In a further preferred embodiment of the present invention, the limiting element is at least partially arranged inside the cap. With this the limiting element is also protected by the cap, guaranteeing that the reference value at minimum capacitance value remains constant over time.

In yet a further preferred embodiment of the present invention, the cap comprises a thread into which the limiting element is at least partially screwed. This represents a particularly simple and cost-effective way of implementing the limiting element.

In another preferred embodiment of the present invention, the limiting element is a threaded pin. A threaded pin can easily be provided, and the length of the pin can be used to define the minimum capacitance value.

In yet another preferred embodiment of the present invention, the maximum distance between the first plate and the movable plate is adjustable from outside the cap. With this the minimum capacitance value can be defined and adjusted when the capacitor is fully assembled and even in operation.

In a further preferred embodiment of the present invention, the maximum distance between the first plate and the movable plate is adjustable by screwing and unscrewing the limiting element into the cap. This represents a particular simple and cost-effective way to provide for a limiting element allowing for adjusting the minimum capacitance value.

In yet a further preferred embodiment of the present invention, the ball screw is configured such as to be able to increase the distance between the first plate and the movable plate with a torque less than or equal to 0.5 N·m, advantageously less than or equal to 0.3 N·m, especially less than or equal to 0.25 N·m. This allows to lower the requirements of the motor used to drive the movable plate and thus to adjust the capacitance value. With this is smaller and cheaper motor can be used.

In yet another preferred embodiment of the present invention, the mechanical drive system comprises a coupling element for attaching a threaded shaft of the ball screw to a drive motor. This allows for driving the ball screw with a motor.

BRIEF DESCRIPTION OF THE DRAWINGS

FIG. 1 shows a schematic sectional view of a vacuum variable capacitor according to an embodiment of the present invention.

DETAILED DESCRIPTION

FIG. 1 shows a schematic sectional view of a vacuum variable capacitor 1 according to an embodiment of the present invention.

The vacuum variable capacitor 1 comprises a vacuum sealed enclosure 2 with a first plate 3 and a second plate 4 electrically separated by an insulating element 5. Inside the enclosure 2 a fixed electrode 6, advantageously a spiral or cylindrical electrode (or a set of cylindrical surfaces forming an electrode), is attached to the first plate 3. A movable plate 7 with a movable electrode 8, advantageously a spiral or cylindrical electrode (or as set of cylindrical surfaces forming an electrode), is attached inside the enclosure 2 to the first plate 4 by means of a vacuum bellows 9. As is well known to the skilled person, these capacitance generating electrodes can be arranged as intertwined spirals or concentric, equally spaced, cylinders in order to optimize voltage and power capabilities of the capacitor for a given available volume of vacuum dielectric, hence for a given size or footprint of the capacitor.

A mechanical drive system 10 is provided for translating the movable plate 7 and with it the movable electrode 8 relative to the first plate 3 and the fixed electrode 6 so as to vary the capacitance of the capacitor. The mechanical drive 10 comprises a ball screw 11 with a threaded shaft 12 arranged such that by rotating the shaft 12 the distance between the movable plate 7 and the first plate 3 can be adjusted. Thanks to the ball screw, the distance between the movable electrode 7 and the first plate 3 can be modified by applying a small torque to the threaded shaft 12. Advantageously, the ball screw 11 is configured such that the capacitance of the capacitor can be adjusted by applying a torque less than or equal to 0.5 N·m, even more advantageously less than or equal to 0.3 N·m, especially 0.25 N·m.

As can be seen in FIG. 1, a nut 13 is attached to the ball screw 11 and exhibits a first shoulder 13a arranged to abut against the limiting element 14 that is provided to limit the maximum distance between the first plate 3 and the movable plate 7 and with that to define the minimum capacitance of the capacitor 1. It is important to understand that the limiting element 14 is configured such that the maximum distance between the first plate and the movable plate, and thus the minimum capacitance of the capacitor, is reached when the first shoulder 13a of the nut 13 abuts against the limiting element 14. With other words, the minimum capacitance is not defined, like in the prior art capacitors, by the maximum compressibility of the vacuum bellows 9 but by the distance between the end of the limiting element facing the movable plate and the first shoulder of the nut.

In the embodiment of FIG. 1, the limiting element 14 has the form a threaded pin screwed partially in cap 15 covering the mechanical drive system 10 in particular the ball screw 11. As it can easily understood from FIG. 1, the threaded pin 14 can be screwed and unscrewed from outside the cap 15, for instance by means of a screwdriver. By screwing and unscrewing the threaded pin 14, the maximum distance between the first plate 3 and the movable plate 7, and with this the minimum capacitance of the capacitor 1, can precisely be adjusted. Of course, the minimum capacitance of the capacitor 1 can also be adjusted by choosing a limiting element of a different length.

The nut 13 is partially arranged in a guiding element 16 and exhibits a second shoulder 13b arranged to abut against an edge 16a of the guiding element for limiting the minimum distance between the first plate 3 and the movable plate 7 and thus for defining the maximum capacitance of the capacitor.

Advantageously, a coupling element 17 is provided for attaching the threaded shaft 12 to a drive motor.

Finally, it should be pointed out that the foregoing has outlined one pertinent non-limiting embodiment. It will be clear to those skilled in the art that modifications to the disclosed non-limiting embodiment can be effected without departing from the spirit and scope thereof. As such, the described non-limiting embodiment ought to be considered merely illustrative of some of the more prominent features and applications. Other beneficial results can be realized by applying the non-limiting embodiments in a different manner or modifying them in ways known to those familiar with the art.

The invention claimed is:

1. A vacuum variable capacitor comprising a vacuum sealed enclosure to contain a vacuum dielectric medium, wherein the enclosure comprises a first plate and a second plate, the first plate and the second plate being separated by an electrically insulating element, a fixed electrode attached inside the enclosure to the first plate and a movable electrode attached to a movable plate, wherein the movable plate is attached inside the enclosure to the second plate by at least one vacuum bellows, wherein the vacuum variable capacitor comprises a mechanical drive system for displacing the movable plate relative to the first plate so as to vary the capacitance of the vacuum variable capacitor, wherein the mechanical drive system comprises a ball screw arranged to drive the movable plate and wherein the mechanical drive system comprises outside of the vacuum sealed enclosure a limiting element limiting the maximum distance between the first plate and the movable plate, wherein the drive system comprises a nut attached to the ball screw, wherein the nut comprises a first shoulder configured to abut against the limiting element to limit the maximum distance between the first plate and the movable plate.

2. The vacuum variable capacitor according to claim 1, wherein the maximum distance between the first plate and the movable plate is adjustable by the limiting element.

3. The vacuum variable capacitor according to claim 1, wherein the nut is at least partially arranged in a guiding element of the enclosure and wherein the nut comprises a second shoulder configured to abut against an edge of the guiding element to limit the minimum distance between the first plate and the movable plate.

4. The vacuum variable capacitor according to claim 1, comprising a cap arranged to cover the ball screw.

5. The vacuum variable capacitor according to claim 4, wherein the limiting element is at least partially arranged inside the cap.

6. The vacuum variable capacitor according to claim 5, wherein the cap comprises a thread into which the limiting element is at least partially screwed.

7. The vacuum variable capacitor according to claim 6, wherein the limiting element is a threaded pin.

8. The vacuum variable capacitor according to claim 6, wherein the maximum distance between the first plate and the movable plate is adjustable by screwing and unscrewing the limiting element into the cap.

9. The vacuum variable capacitor according to claim 4, wherein the maximum distance between the first plate and the movable plate is adjustable from outside the cap.

10. The vacuum variable capacitor according to claim 1, wherein the ball screw is configured such as to be able to increase the distance between the first plate and the movable plate with a torque less than or equal to 0.5 N·m.

11. The vacuum variable capacitor according to claim 10, wherein the torque is less less than or equal to 0.3 N·m.

12. The vacuum variable capacitor according to claim 10, wherein the torque is less than or equal to 0.25 N·m.

13. The vacuum variable capacitor according to claim 1, wherein the mechanical drive system comprises a coupling element for attaching a drive motor to a threaded shaft of the ball screw.

14. The vacuum variable capacitor according to claim 1, wherein the displacing of the movable plate relative to the first plate involves relative translational movement.

* * * * *